Feb. 28, 1950     V. P. HARVEY ET AL     2,499,271
AMMUNITION FEEDING DEVICE FOR ORDNANCE
Filed May 15, 1945     11 Sheets-Sheet 5

Feb. 28, 1950  V. P. HARVEY ET AL  2,499,271
AMMUNITION FEEDING DEVICE FOR ORDNANCE
Filed May 15, 1945  11 Sheets-Sheet 8

Patented Feb. 28, 1950

2,499,271

UNITED STATES PATENT OFFICE 2,499,271

AMMUNITION FEEDING DEVICE FOR ORDNANCE

Valentine Pearce Harvey, Gordon Francis Wellington Powell, and William Wood, Deptford, London, England, assignors to Molins Machine Company, Limited, London, England Application May 15, 1945, Serial No. 593,834
In Great Britain February 7, 1944

19 Claims. (Cl. 89—33)

This invention concerns improvements in or relating to ammunition feeding devices for ordnance and relates more particularly to a device for supplying ammunition to a land gun which is required to maintain a rapid rate of fire for a comparatively brief period.

An anti-aircraft gun for example, may be required to fire twenty or thirty rounds in quick succession during an action, and where these rounds are of large calibre the task of maintaining a supply of rounds to the gun is extremely exhausting to the crew, and on a 4.5 inch quick firing gun for example is actually beyond their strength. As the guns in question often have automatic equipment for fuze-setting, ramming and firing, this can only operate at its maximum efficiency if an adequate supply of rounds is forthcoming.

According to the invention there is provided an ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means (e. g. an endless conveyor) to feed a round automatically to the delivery position for each cycle of movement of the loading tray, a waiting tray mounted to move with the gun cradle, a transfer device mounted to swing about the trunnion axis of the gun and adapted to engage a round at the delivery position and actuated automatically in timed relationship with the movement of the loading tray to transfer the round to the waiting tray, and means adapted to move a round from the waiting tray to the loading tray when the latter is in the firing position.

The transfer device may be adapted to be automatically actuated to transfer a round from the delivery position to the waiting tray as the loading tray moves in to the loading position, means movable with the gun cradle being adapted to cooperate with a part movable with the transfer device automatically to stop the transfer device at the appropriate angle, and means being provided automatically to return the transfer device to the delivery position after it has delivered a round to the waiting tray.

The ammunition feeding device may comprise control-means for keeping a round in position on the waiting tray, a pusher adapted to push said round into the loading tray and means for releasing said control-means when the round is to be delivered to the tray. The pusher may be actuated by means controlled by the movements of the loading tray. The loading tray may be coupled to the pusher by a telescopic lever embodying a spring, the pusher being held against movement by a catch until the loading tray has moved over nearly to the firing position, during which movement the spring is stressed, whereupon the catch is tripped by the moving loading tray and the energy stored in the spring causes the pusher to operate.

The magazine may be carried by a framework attached to one of the side frames which support the gun trunnions for movement with the gun in azimuth, the framework being partly supported by wheels or rollers running a guide track fixed on the ground. The framework may be supported on a platform attached to one of said side frames and rotatable with the gun in azimuth.

The transfer device may comprise clips adapted to support and retain a round and means for rotating said clips when the device reaches the waiting tray to remove the round from the device and deliver it to the waiting tray, and devices for positively holding the clips in position after rotary movement in either direction and means for tripping said devices in timed relationship with the movements of the transfer device and restoring the clips to their previous position for the purpose described.

The feeding means for the rounds and transfer device may be driven by electric motors and the feeding means may be intermittently operated, switches being provided to start and stop the motors in timed relationship with the movements of the loading tray.

The invention will be more fully described with reference to the accompanying drawings, in which—

Like reference numerals refer to like parts throughout the specification and the drawings.

A 4.5 inch quick firing anti-aircraft gun for which the designs illustrated are suitable is provided with a loading tray and a support or shelf (herein and in the appended claims called a "waiting tray") on which a round is placed and from which it is moved into the loading tray while the loading tray is in the firing position, the loading tray being thereafter swung to bring the round into alignment with the breech (the loading position) whereupon the round is rammed and the gun is fired when the loading tray has returned to the firing position. In up-to-date guns of this kind all the operations except for the actual lifting of the round to deliver it to the loading tray are performed automatically by power driven devices, and a fuze-setting device is included.

Referring to the drawings, the invention will be broadly described with reference to Figures 1 and 2, whereafter the remaining views which show various details, modifications and more fully developed devices according to the invention will be described.

The ammunition feeding device comprises a substantial framework indicated generally by the reference 1, which projects outwardly from the side frame 4 of the gun on the loading tray side so that it is parallel to a radial line drawn from the centre on the line C—G on which the gun swings in traversing and its centre line C—C is about nine inches behind this line, that is towards the rear of the gun. The location of the device relatively to the gun will be better understood from Figure 7. At the outer end, the framework is provided with two wheels 2 which travel on a circular rail track 3 arranged concentrically about the said centre. As such a track may not be truly horizontal due either to incorrect installation or to sinking of its foundation during the course of time, the inner end of the framework is connected to the gun frame 4 by a pivot 5 which permits the framework to rise and fall to accommodate itself to any irregularity in the rail track as the gun and framework rotate, although the framework is constrained to maintain its substantially radial disposition with respect to the vertical centre of rotation on the line C—G of the gun.

At positions near the ends of the framework, bearings 6 and 7 are provided in which are journalled two vertical shafts 8 and 9 each of which is provided with two sprocket wheels. The shaft 8 has sprocket wheels 10 and the shaft 9, which is the driving shaft, has sprocket wheels 11. On these sprocket wheels there are mounted two endless conveyor chains 12 and 13 provided at spaced intervals with clips or pockets adapted to embrace parts of the body of a round and described in more detail below. Thus when the conveyor is loaded it supports a number (e. g. 30) rounds R, each round standing vertically with its nose upwards.

The upper clip 14 of a pair is of substantially semi-circular form with slightly out-turned free ends and the lower clip 15 is of substantially the same shape but is provided with a flat support plate 16 on which the base of a round may rest. A clip 15 is shown in detail in Figures 3, 4, 5 and 6. The underside of the support-plate 16 has a roller 17 mounted on it and beneath the conveyor track there is fixed a guide rail 18 on which all of these rollers run, to afford support for the weight of the rounds. The support plate 16 is cut away or recessed as shown at 19, Figure 3, to avoid the possibility of accidentally striking the percussion cap of a round and all other parts of the device which engage the base of a round are similarly treated.

Figure 3:
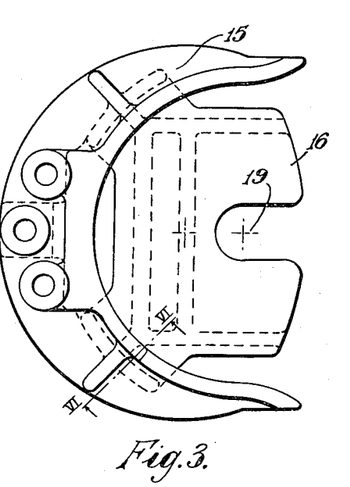
Figure 3 is a plan of a bottom clip.
Figure 4:
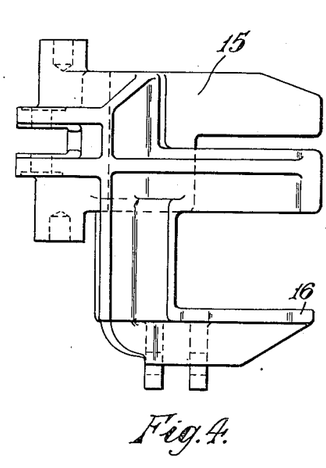
Figure 4 is an elevation of Figure 3.
Figure 5:
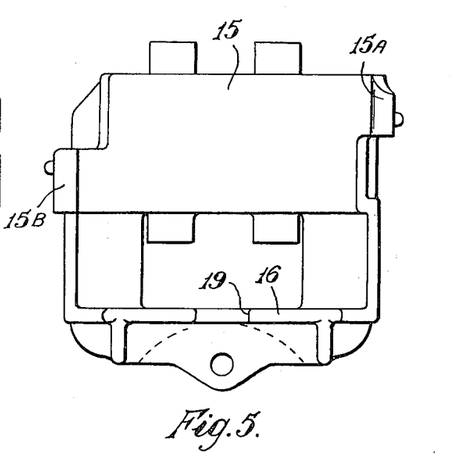
Figure 5 is a side elevation of Figure 4.
Figure 6:
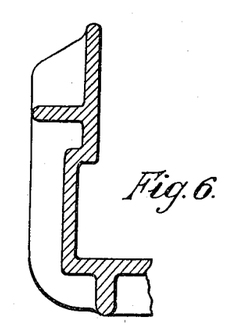
Figure 6 is a section of Figure 3 on the line VI—VI.

In order to keep the conveyor as short as possible, one pair of clips slightly overlaps the next pair, the out-turned free ends being alternately arranged at different levels from the ground. This will be better understood from Figure 5 where it will be seen that the right-hand out-turned end 15A is higher than the left-hand out-turned end 15B. This arrangement enables the rounds to be held on the conveyor very close together and yet avoids any interference between one pair of clips and the next at the position where the rounds are removed from the clips when a pair begin to move in an arcuate path at the end of a conveyor run as will be better understood later. During the movement of the rounds along the conveyor they are guided by a guide 33, attached to the frame 1, which engages the necks of the cartridge cases.

Figure 2:
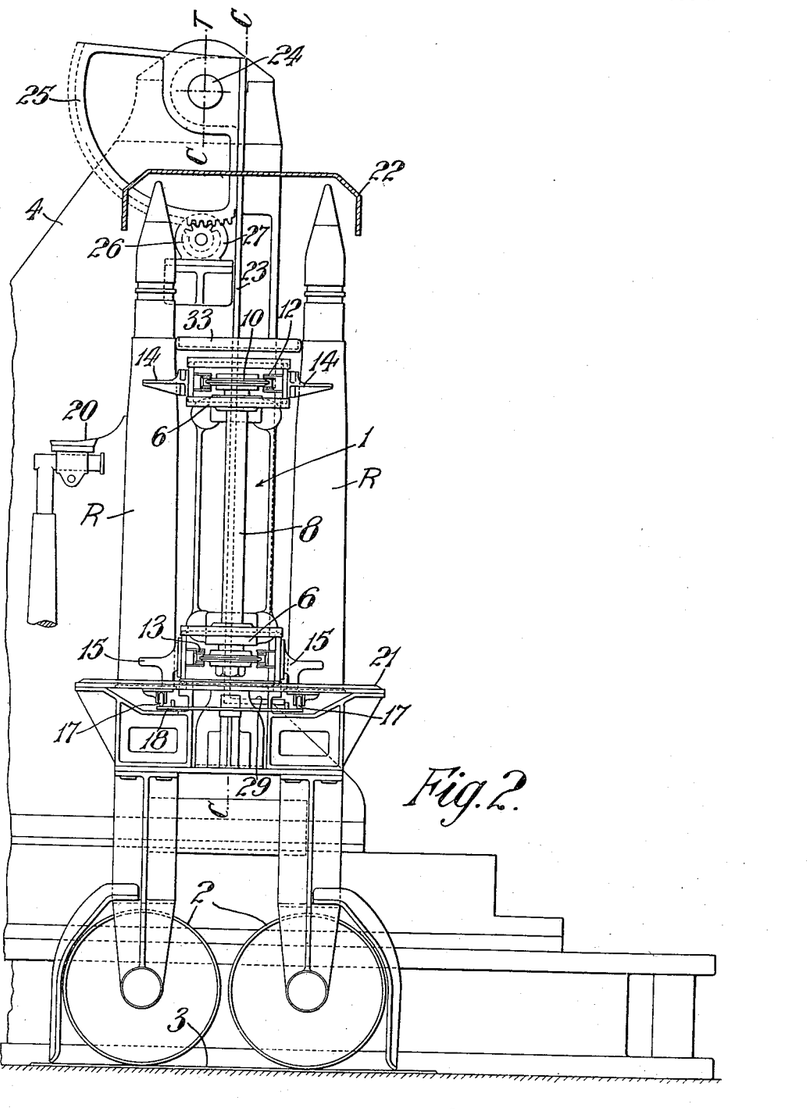
Figure 2 is an end elevation of Figure 1.

The framework 1 is located between the two runs of a conveyor chain, as shown in Figure 2, so that the clips or pockets of the conveyors extend outwardly on each side of the framework and both runs of the conveyor may be loaded with rounds. In practice, all the clips are loaded but in certain cases two near to a seat 20 for one member of the gun crew, where such seat is provided, are left empty, as if these two were loaded the rounds would inconvenience the man in passing.

Surrounding the framework and conveyor system is a broad foot rail or platform 21 which forms a guide for the lower part of a round as it travels with the conveyor and which is attached to the framework, and a guard member 22 is similarly arranged above the framework to overhang the noses of the rounds and prevent them from falling out of the open clips. Rounds are loaded into the clips by being canted inwards to enable the noses to clear the guard and then lifted on to the foot rail. The loader then lifts a round by its base and drops the latter on the support plate of a lower clip which is at a lower level than the foot rail, see Figure 2, or he may shift the round from the rail to the support plate by a vigorous push or kick. The whole, or a part of the conveyor is loaded before the gun is required for action, but if necessary it may be fed whilst it is running.

At the end of the framework near to the gun trunnion there is provided a transfer member.

This consists of an arm or lever 23 pivoted on the trunnion 24 and capable of movement from a position substantially in alignment with a vertical line drawn through the trunnion centre C—T, through an angle of up to 90°, to cover all elevations from, for example, 15° upwards. The arm is provided with a gear quadrant 25 at its hub and a pinion 26 driven by an electric motor 27 is adapted to engage the quadrant and rotate the arm through the angle required at such time as a round is to be transferred.

Figure 1:
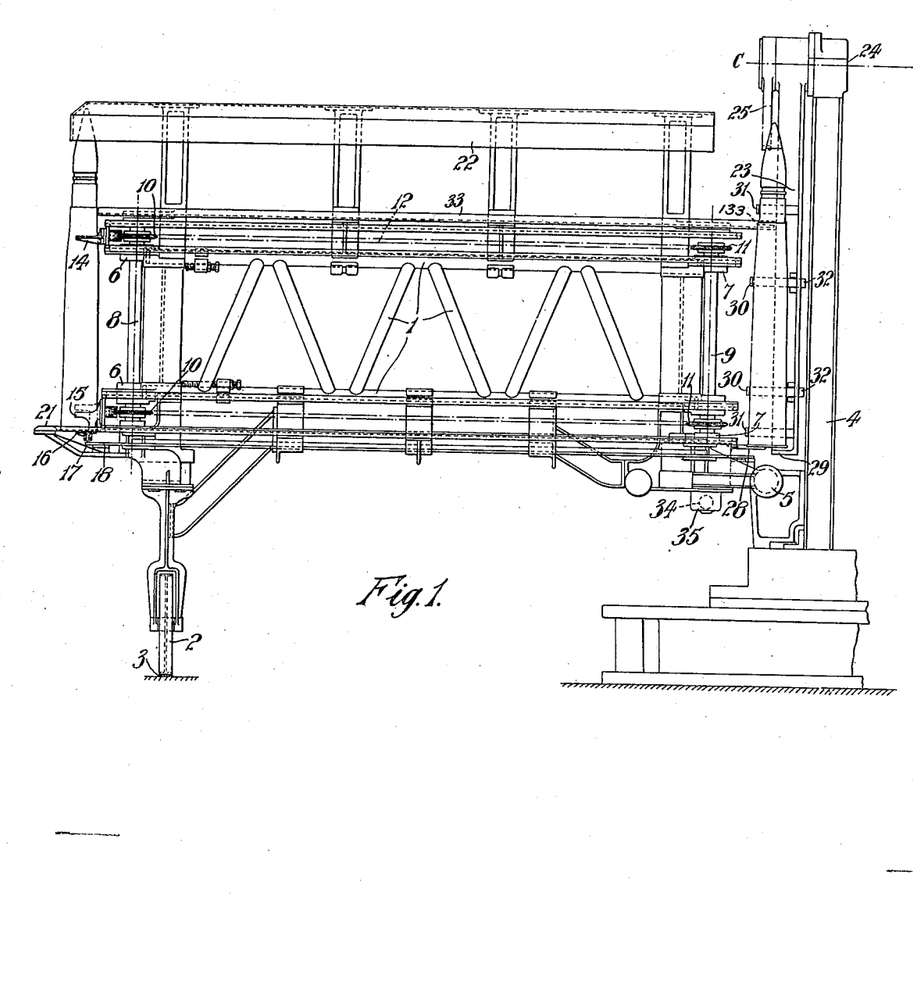
Figure 1 is a side elevation of a conveyor and also shows its location relatively to the gun trunnions and its pivot centre.

The transfer arm and the devices for moving a round into engagement therewith and delivering the round to the gun are described more fully later on but the following description relating to Figures 1 and 2 is sufficient for understanding the general nature and operation of the arm and devices.

At a position near to the end of the conveyor run on the transfer side of the conveyor, that is the side furthest from the trunnion or the right-hand side in Figure 2, there is provided a fixed support plate 28 whose upper surface is slightly below (e. g. 1/8") the level of the support plates of the lower clips of the conveyor and as a round approaches this position it is urged out of the clips by a guide (not shown in Figures 1 and 2) as the clips begin to move in a semi-circular path about the axis of the neighbouring conveyor shaft 9. The movement is such that the round comes to rest with about half of its base resting on the fixed support, the other half overhanging the edge, see Figure 1. Suitable fixed guides such as an extension 133 of the guide 33 may be provided to steady the round in this position.

The transfer arm is also provided with a support face 29 at its free end and as the arm moves forward to the round-engaging position, the support moves into alignment with the fixed support, and thus beneath the exposed half of the base of the round. Along the length of the arm there are disposed two semi-circular movable clips or carriers 30 and two fixed clips 31 and when the base of the round is engaged by the rearwardly moving arm the round falls towards the arm and is caught and held securely by the clips and support face.

The clips 30 are pivoted to the transfer arm 23, and arms 32 on the clips 30 extending beyond the pivots are adapted to strike against abutments of any suitable kind mounted on the gun in the neighbourhood of the loading tray. As the arms 32 engage the abutments the clips will rotate about the pivots and turn the round over so that it can roll into the waiting tray. The movement of the round to the loading tray is assisted by any suitable form of mechanical pushers as at high elevations the round may not roll easily by its weight alone. A construction of this nature is described later with reference to Figure 15.

The conveyor chains are driven intermittently by a suitable electric motor started and stopped by switches.

Figures 10, 11:
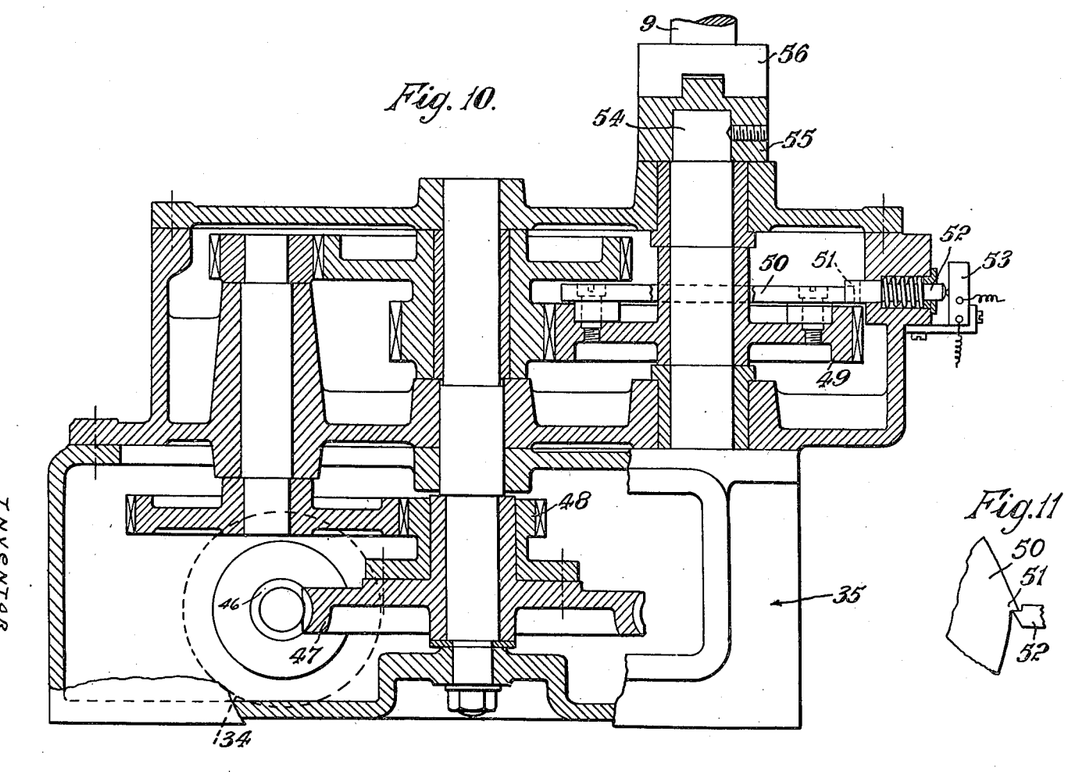
Figure 10 shows a section of the gear box of the conveyor drive.
Figure 11 is a detail of Figure 10.

The arrangement illustrated is found to be satisfactory for the gun in question. An electric motor 34 drives the conveyor shaft 9 through a gear box 35 which is constructed as shown in Figure 10 and the motor is controlled as described later with reference to Figure 16.

Figure 7:
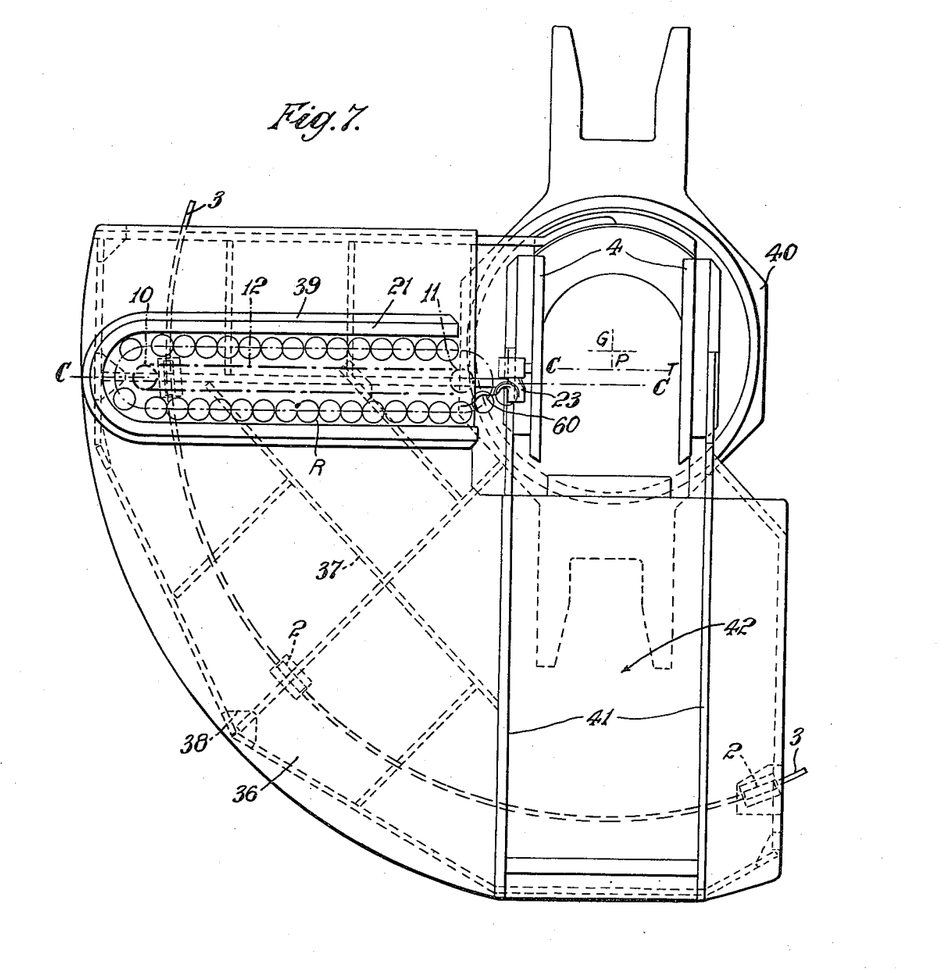
Figure 7 is a plan view of a modification where the conveyor is supported on a platform which rotates with the gun.

The arrangement shown in Figure 7 represents a more fully developed construction according to the invention. The general design of the conveyor is similar to that already described with reference to Figures 1 and 2 but the whole arrangement is mounted on a quadrant-shaped platform 36 fixed to the gun frame 4 and rotatable therewith about the pivot axis G—P which is at the middle of the gun base plate 40. The framework is stiffened by beams such as 37 which are connected at suitable points by plates 38. In this case the rollers 2 which run on the rail 3 are fixed beneath the platform. A guard 39 surrounds the base of the conveyor and its upper surface is constructed to function as the footrail 21 and bears the same reference. The platform comprises two vertical walls 41 to define a space or chute 42 through which the spent cases pass as they are discharged from the gun. The shape of this chute is more clearly shown in Figure 8. In Figure 7 there is also shown the guide previously referred to which urges the rounds out of the clips as they approach the transfer point. The guide is shown as a heavy line marked 60 but is more clearly shown in Figure 9. The chain conveyor is shown in heavy dot and dash lines and the path of the centres of the conveyor clips as a light dot and dash line.

Figure 8:
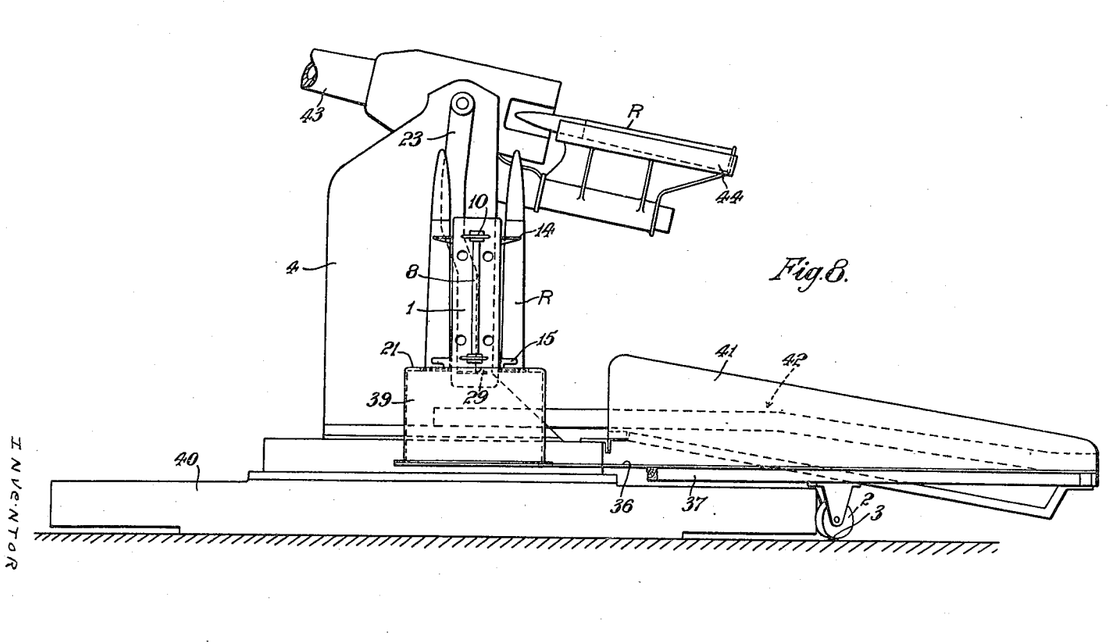
Figure 8 is a side elevation of Figure 7 and shows diagrammatically the gun and loading tray.

Referring to Figure 8, this view shows diagrammatically the gun barrel 43 and the loading tray 72. As explained in detail with reference to Figures 12 to 15, the round is delivered on to a waiting tray from which it is rolled into the loading tray. A switch is fixed on the waiting tray whereby the upward movement of the arm 23 is limited as will be better understood when the electrical connections are described with reference to Figure 16.

Figure 9:
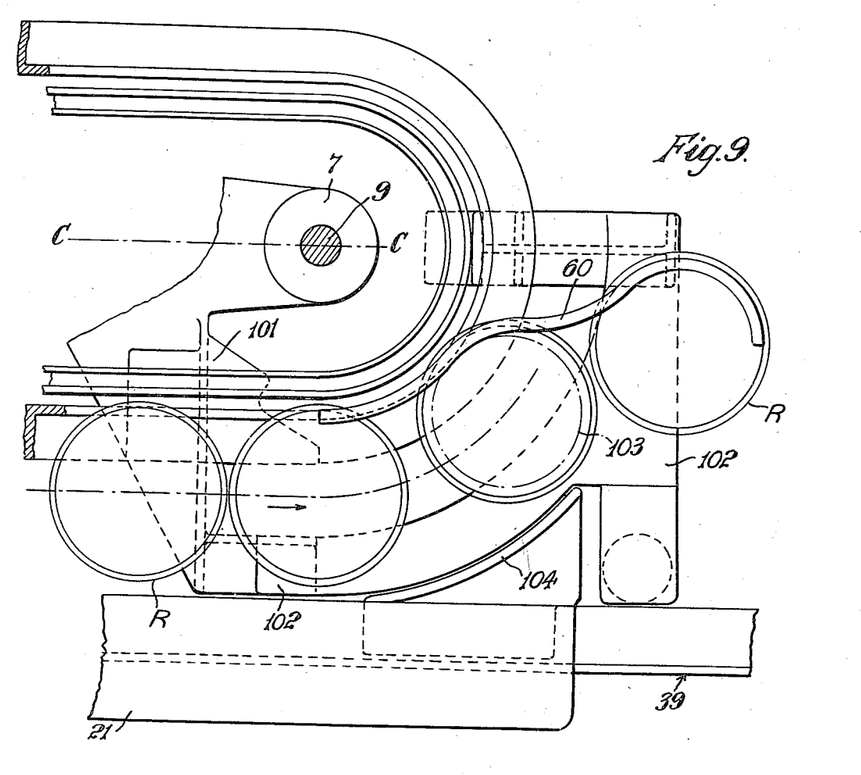
Figure 9 is a plan of the delivery end of the conveyor drawn to a larger scale.

Figure 9 shows to a larger scale the inner end of the conveyor and how the rounds are deflected from the conveyor path. The bearing 7 of shaft 9 extends as a bracket 101 which supports a plate 102 having an inner edge curved to an arc struck on the centre of the shaft 9. The shape of the guide 60 is clear in this view and it is supported at a level sufficiently high above the base of the rounds R to contact with a part of the tapering cartridge case of the diameter of the chain line circle marked 103. A guard 104 which in effect continues the guard rail 21 is fitted outside the conveyor track and curved as shown. It will be clear that as the conveyor moves in the direction of the arrow, the rounds engage the guide 60 and are pressed out of the conveyor clips. As they do this their bases move more and more on to the plate 102 until they reach the position on the extreme right of the figure and are overhanging the plate 102 as shown. At this position they are ready to be picked up by the transfer arm. In order to facilitate the movement across the plate 102, the plate is formed with its upper face slightly inclined to the horizontal and rising from the left-hand side of the plate towards the right. As the bases of the rounds travel in a horizontal plane the contact between base and plate is therefore made on a line on the edge of the rim of the base and so the rounds tend to roll along the plate on the corner or edge of the rim which makes the movement easier.

Referring to Figures 10 and 11 the gear-box 35 has the motor 34 bolted to its rear face and the spindle of the motor has a worm 46 fixed thereon. This engages with a worm wheel 47 to which is fixed a gear wheel 48 which constitutes the first gear of the reduction gear train shown in Figure 10. The last gear 49 of the train has fixed thereto a disc 50 provided with a tooth 51, which when it has been moved one pitch by the conveyor being driven by the motor 34 operates the plunger 52 and thus constitutes a switchoperating device for stopping the motor 34 in timed relationship with the transfer arm 23 so that the conveyor moves intermittently in timed relationship with the movements of said arm. The tooth engages a spring-pressed plunger 52 and the outer end of the plunger operates a switch 53 referred to again in connection with the wiring diagram Figure 16.

The shaft 54 to which the gear 49 is fixed has also fixed thereto one half 55 of an Oldham coupling the other half 56 of which is fixed to the conveyor drive shaft 9.

Figures 12, 13:
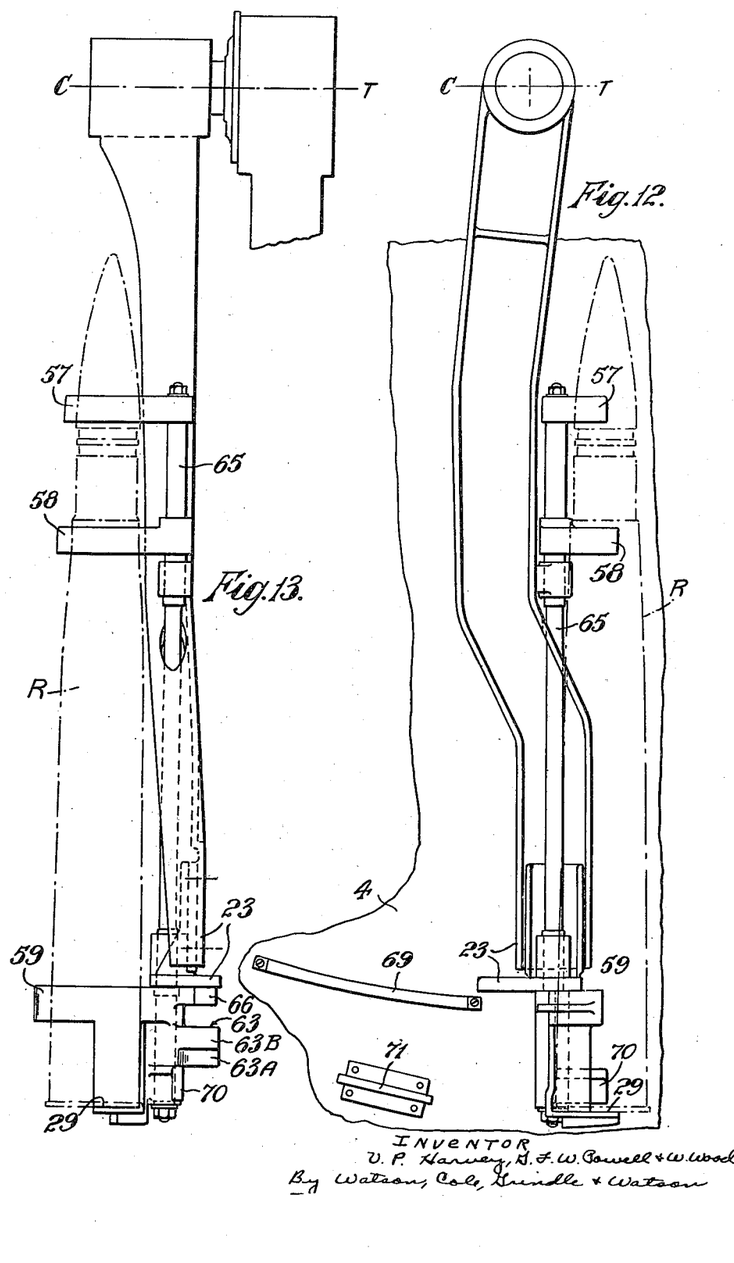
Figure 12 is an elevation of a transfer arm and part of the side frame of the gun.
Figure 13 is a side elevation of the arm shown in Figure 12.

The transfer arm 23 shown in Figures 12 and 13 differs in some respects from that previously described with reference to Figure 2. The arm 23 is operated by a motor-driven gear and quadrant as before. The clips 57, 58 and 59, Figures 12 and 13, which support the round are all movable in this instance, and all have semicircular recesses like the clips 59 shown in Figure 14. The lower clips 59, Figures 12 and 13, whose shape is better seen in Figure 14 also comprises the base support 29. In operation the arm, as seen in Figure 12, moves anti-clockwise to raise the round, and as shown has already moved a short distance to come into engagement with the round. Thereafter it moves rearwards and upwards until it reaches a position from which the round is delivered on to a waiting tray 61, Figure 15, from which it is rolled into the loading tray as described later with reference to Figure 15. The arm 23 strikes a switch 62, Figure 16, associated with the waiting tray, and the motor and arm are stopped. But just before the arm comes to a standstill a tappet 63 which constitutes part of the bottom clip strikes against the abutment 64, Figure 15, formed on the waiting tray, and the rod 65 to which all the clips 57, 58 and 59 are fixed is rotated in its bearings and the clips are therefore turned over to deliver the round on to the shelf waiting tray 61. In order to reduce shock and provide a smooth and relatively slow action to the movement the tappet and abutment each have two coacting surfaces so that the movement takes place in two stages. First the surface 63A of the tappet engages surface 64A of the abutment and then surfaces 63B and 64B engage. A consideration of the plan view, Figure 14, will render this clear.

Figures 14, 14A, 16:
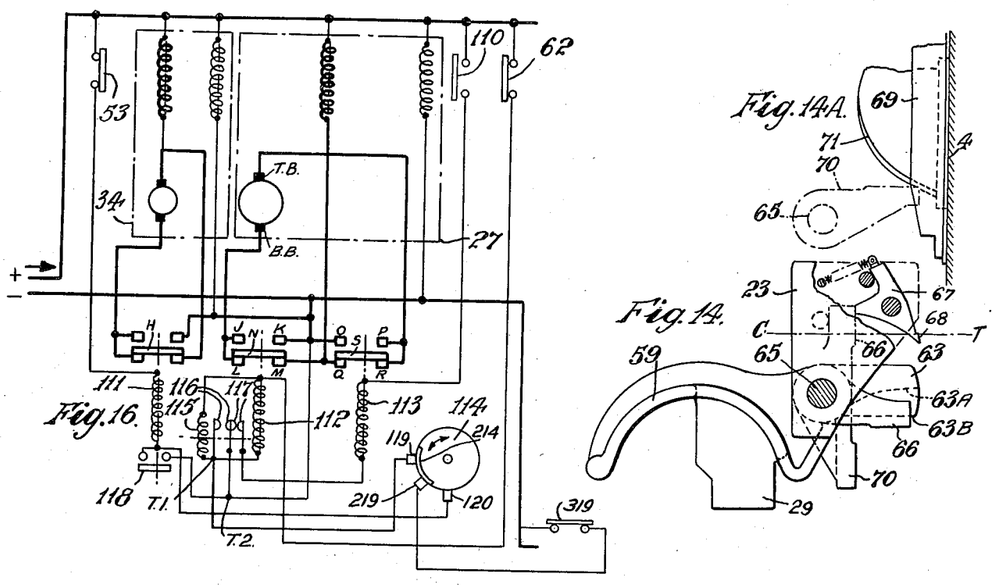
Figure 14 is a plan view of the lower part of Figure 12.
Figure 14A illustrates the form of cam which may be used to operate the clip positioning lever.
Figure 16 is a wiring diagram showing the connections and controls for motors which operate transfer arm and conveyor respectively.

Later the arm moves back to its original or down position in accordance with the switching operations hereafter described with reference to Figure 16, but by this time a fresh round is waiting to be picked up and it is necessary for the clips to remain in their turned-over position during the downward movement of the arm to avoid striking said fresh round. For this purpose the clip 59 comprises a stop arm 66 which is caught as shown in chain lines in Figure 14 by a spring catch 67 which is pivoted on the foot or flat base of the arm 23. As the arm approaches its final down position the toe 68 of the catch engages a cam 69 fixed on the side of the gun frame 4 and releases the stop lever from the catch. As illustrated in Fig. 14A a lever 70 formed on the clip contacts another cam 71 at this position and is rotated thereby to restore all the clips to their original position ready to engage the aforesaid fresh round on the next forward and upward stroke.

Figure 15:
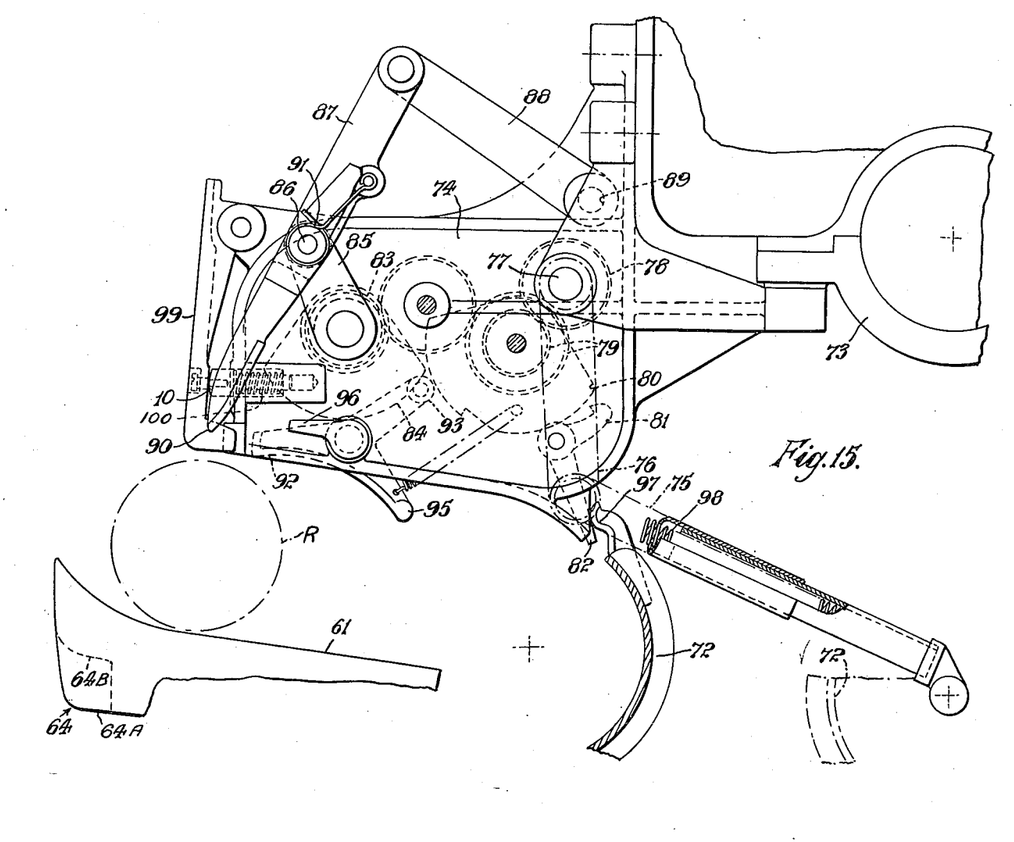
Figure 15 is an elevation of mechanism for transferring a round from the transfer arm to the loading tray.
Figure 17:
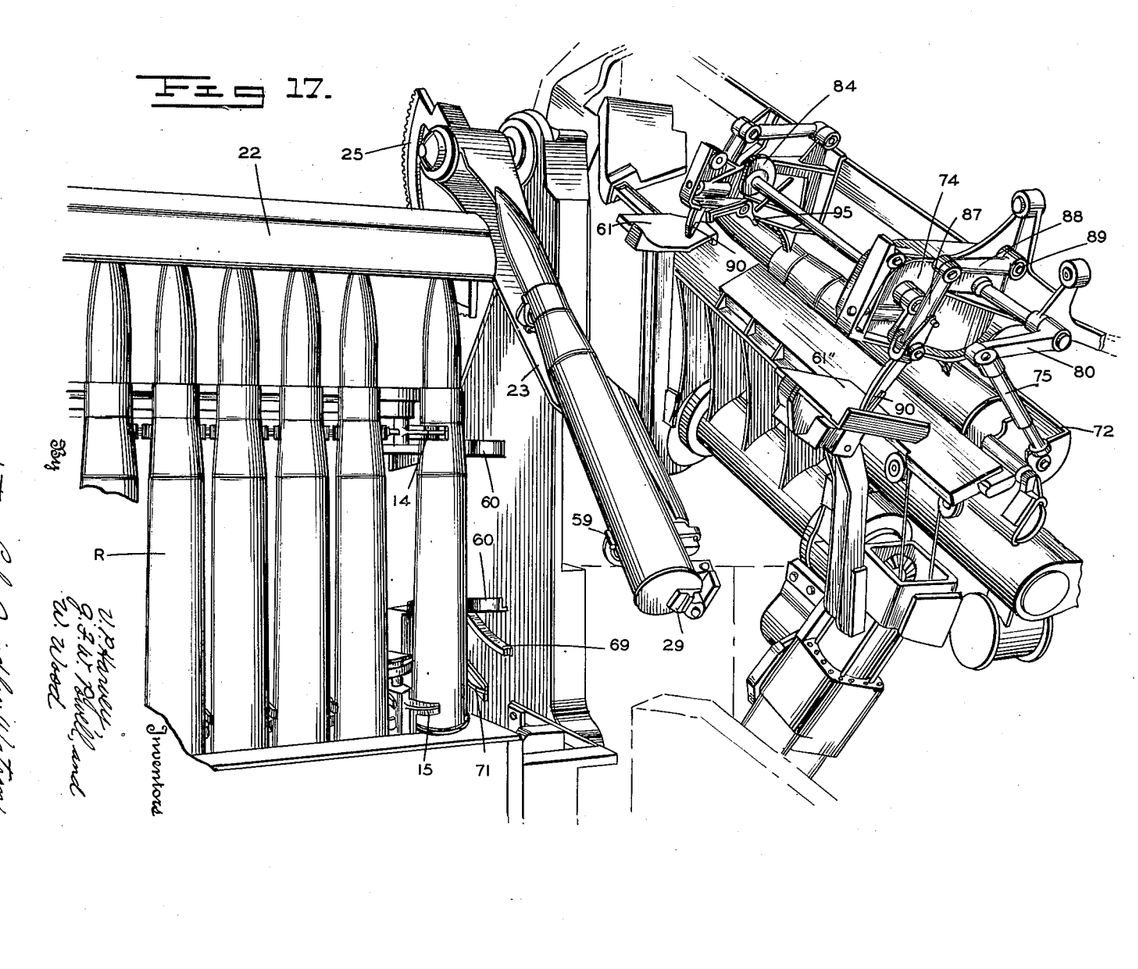
Figure 17 illustrates diagrammatically the inter-relation of the waiting tray, the loading tray and the gun structure.

It has been stated that mechanical pushers may be provided to assist in the transfer of rounds from the waiting tray to the loading tray. An arrangement for this purpose is shown in Figure 15. The loading tray 72 (full line position) is shown in the round receiving position and in proximity to the waiting tray 61 on to which the transfer arm delivers the rounds. In Figure 15 a portion of the loading tray 72 is shown in full lines in round receiving position and again in chain lines in its ramming position. As the loading tray swings from the chain line to the full line position, it operates the pusher 90, by the action of the telescopic link 75 so that the pusher moves the round along the waiting tray as the loading tray approaches to receive the round. The waiting tray and of course the loading tray are supported on the gun cradle 73 and share its movements of elevation and depression. This relationship may be seen most clearly by reference to Figure 17. Above the loading tray and waiting tray there is arranged a box or frame 74 which carries the mechanical devices for pushing the round, and this box is also fixed to the cradle. A telescoping link 75 described in more detail later is pivoted to the loading tray and is shown in the view in the position occupied when the loading tray swings over to the ramming position. The link is shown broken and continued in chain lines to avoid obscuring other parts. The other end of the link is pivoted to a lever 76 (also shown in chain lines) which is fixed to a shaft 77 on which a gear wheel 78 is also fixed. Thus as the loading tray oscillates, the gear is twisted to and fro. The gear engages with the smaller gear of a compound gear 79 to which is fixed a quadrant-shaped catch plate 80 adapted to engage at times with a hook or pawl 81 having an extension lever 82 fixed thereto.

The larger gear of the compound gear 79 drives a further gear 83 through an idler 179. To the gear 83 is attached a cam 84 and a lever 85. The free end of the lever 85 is pivoted at 86 to a link 87 the other end of which is pivoted to a link 88 pivoted to the box at 89. The link 87 supports a pusher 90 which is also pivoted at the pivot 86 and the pivot point comprises a torsion spring 91 whereby the pusher is normally constrained to move with the link but can bend relatively thereto, anti-clockwise, if sufficient pressure is applied to overcome the spring 91.

In operation and by virtue of the mechanism described, the pusher will move behind a round R at a certain time and urge it down the waiting tray towards the loading tray and will thereafter move back to repeat the operation on the next round. During this return movement the pusher trips over the surface of said round by turning on the pivot 86 against the influence of the spring 91.

To retain the round substantially in the position shown and prevent it from prematurely rolling down the waiting tray, there is provided a pivoted stop comprising a three-armed bell crank. The arm 92 engages the round as it is deposited on the waiting tray when the cam follower on arm 93 moves down the cam 84 and the arm 95 provides a further stop a little further down the waiting tray to receive the round as arm 92 rises and releases the round. Later the arm 95 rises and lets the round move on to the tray as it is pressed forward by the pusher. A handle 96 is provided for manipulating the stops when setting up the mechanism or for drill or like purposes.

The purpose of the catch-plate 80 and the pawl 81 is to delay the operation of the mechanism until such time as the loading tray is near enough to the full line position shown (i. e. the firing position) to ensure that it will be in position to receive the round as it is pushed down the waiting tray. The loading tray is provided with an abutment 97 which engages the extension lever 82 on the loading tray return movement and disengages the pawl from the catchplate. Meanwhile the spring 98 in the telescoping link 75 has been compressed by the movement of the loading tray and as soon as the pawl is tripped the mechanism operates and the pusher presses on the round and moves it into the loading tray.

A pivoted flap or buffer 99 is provided with a buffer spring 100 and as a round is lifted by the arm it strikes against the flap just after the clips of the transfer arm turn over to deposit the round on to the waiting tray.

The control of the switches to start and stop the motors will now be described with reference to Figure 16 which shows part of the circuit of an anti-aircraft gun, provided with automatic loading ramming and firing devices, so far as it appertains to the present invention. Both the motors 27 and 34 are compound wound and the motor 34 is controlled by a limit switch 53, a relay 111 and a contact drum 114 while the motor 27 is controlled by limit switches, 110 and 62, two relays 112 and 113, a hold-on relay 115 fitted with a slow-release device, and the contact drum 114.

The limit switch 53 for the conveyor motor 34 is operated by the cam 51 on the conveyor shaft as shown in Figure 11 and previously described with reference to that figure.

The limit switch 110 is closed except at such times as it is opened by the transfer arm 23 when the latter is in the down or round-receiving position.

The limit switch 62 is on the waiting tray and closed except at such times as it is opened by the transfer arm when the latter is in the up or round-delivering position.

The relay 111 is provided with a contact bar H for starting and stopping the motor 34 and also with an auxiliary contact bar 118 which moves up and holds on the circuit for the motor 34 when the circuit through the contact drum 114 ceases owing to the movement of the drum as explained in more detail later.

The relay 112 is for controlling the motor 27 during the upward movement of the transfer arm while relay 113 controls the motor during the downward movement of the arm and the relay 115 is a hold-on relay to cover periods when the circuit for the relay 112 through the contact drum 114 is broken owing to the movement of the drum as explained below.

The drum 114 has two contacts or brushes 119 and 120, the former being connected to the coils of the relays 112 and 115 at the tapping T. 1 and the latter to the coil 111, while a third contact 219 is connected to the negative line through a switch 319. This switch is a switch associated with the breech of the gun and operated by the movements thereof. In the drawing it is shown diagrammatically as a simple switch and for the purpose of understanding the present invention may be regarded as closed while the drum is moving in an anti-clockwise direction, but open when the drum is rotating in a clockwise direction. The drum 114 is rotatable in timed relationship with the movements of the loading tray and rammer and may be mounted for this purpose on the armature of the tray motor or may be one of a series of drums on a separate or timing motor which controls all the switch gear of the gun.

While the transfer arm 23 must move in timed relationship with the loading tray so as to provide a round for each complete cycle of the tray's movement, the timing is not close since it is only necessary that the arm shall deliver a round on to the waiting tray in readiness for the loading tray to receive it. The left-hand end of the circuit is connected to the battery and main switches, the main leads being marked + and —, while the right-hand end is connected to the tray and rammer motors and associated switch gear and equipment.

As shown, the state of the circuit corresponds to the "down" or round-receiving position of the transfer arm.

When the main switch of the apparatus is closed the shunt fields of the motors 27 and 34 are energized and also the tray motor starts to swing the loading tray.

The closing of the main switch also energizes the coil of the "up" relay 112, the circuit being: Positive—switch 62 (closed)—coil 112—tapping T. 1—contact 119—segment 214—contact 219—switch 319 (closed)—negative. The contact bar N of the relay 112 therefore moves up to join the contact blocks J and K thereof and the motor 27 starts to run, the circuit being: Positive—series field—block Q—bar S—block R—top brush T. B.—armature—bottom brush B. B.—block J—bar N—block K—negative. The arm 23 therefore starts to move up to carry a round to the waiting tray.

At the same time as the coil of the relay 112 is energized, the coil of relay 115 is energized since this is in parallel with the coil of relay 112. The contacts 116 of the relay 115 therefore close. The closed contacts 116 provide an alternative or hold-on circuit for the relay 112 which is necessary as the circuit through contacts 119 and 219 will eventually cease when the segment 214 on the drum 114 breaks contact with contact 119 as the loading tray swings over to the ramming position. The circuit for the coil of the relay 112 at that stage is: Positive—switch 62 (closed)—coil 112 tapping T. 1—contacts 116—negative.

The motor 27 continues to move until the arm 23 reaches the same level as the waiting tray or goes as far beyond this level as may be necessary to deposit the round carried by the arm into the waiting tray. When the arm reaches said position the limit switch 62 which is mounted on the waiting tray 61 is operated by the transfer arm 23 to break the circuit to the hold-on relay 115 and thereby to de-energize or release the relay 112.

With the breaking of the circuit of the coil of relay 112 the current to the armature and series field of the motor 27 ceases although the shunt field is still maintained. Moreover the return movement of the contact bar N to the contact blocks L and M short-circuits the armature of 27, the circuit being: Brush T. B.—block R—bar S—block Q—block M—bar N—block L—brush B. B.

The motor 27 is thus dynamically braked and comes to rest. After a small delay due to the nature of the slow-release relay 115 the contacts 116 open and the contacts 117 close and the "down" relay 113 is energized the circuit being: Positive—switch 110 (closed)—coil 113—contacts 117—tapping T. 2—negative. The bar S is therefore raised and the motor 27 starts to move in the reverse direction the circuit being: Positive—series field—block M—bar N—block L—bottom brush B. B.—armature—top brush T. B.—block P—bar S—block O—negative. The motor movement returns the arm to its original or "down" position thus allowing switch 62 to close again and at the end of the movement switch 110 is opened. This causes bar S to move down and stops the current to the armature which is then short-circuited for dynamic breaking the circuit being: Brush T. B.—block R—bar S—block Q—block M—bar N—block L—brush B. B.

Meanwhile the movement of the tray motor has been sufficient to rotate the timing drum 114 so far that the contacts 219 and 120 thereof are closed by the segment 214 long enough to energize the coil of the relay 111 and start the conveyor motor 34 the circuit being: Positive—switch 53 (closed)—coil 111—contact 120—segment 214—contact 219-319—negative.

The relay 111 remains energized when the circuit through 219—214—120 is broken by further drum movement by reason of the circuit through the auxiliary contact bar 118 which has been pulled up by the relay coil and connects the lower end of the coil directly to the negative line. When the conveyor motor has moved the conveyor a distance equal to the pitch of one conveyor clip the switch 53 is momentarily broken by the cam 51 as previously described with reference to Figure 11. Thus the circuit of the relay 111 is broken and its contact bar moves down again and current through the armature of the motor 34 ceases. Short circuiting of the armature and dynamic braking take place in exactly the same way as for motor 27 so it appears to be unnecessary to describe these circuits, except to say that the motor is arranged to run long enough to insure that the switch 51 closes again.

After ramming has taken place the loading tray moves back and reversal of the tray motor moves the drum 114 back to the position shown in the drawing when the apparatus starts again to transfer a round to the waiting tray.

What we claim as our invention and desire to secure by Letters Patent is:

1. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, and means for moving a round from the waiting tray to the loading tray when the latter is in the firing position.

2. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves in to the loading position, a part movable with said transfer device, means movable with the gun cradle and cooperating with said part automatically to stop the transfer device at the appropriate angle, means automatically to return the transfer device to the delivery position after it has delivered a round to the waiting tray, and means for moving a round from the waiting tray to the loading tray when the latter is in the firing position.

3. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, control means for keeping a round in position on the waiting tray, means for moving a round from the waiting tray to the loading tray when the latter is in the firing position, and means for releasing said control means when the round is to be delivered to the loading tray.

4. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves in to the loading position, a part movable with said transfer device, means movable with the gun cradle and cooperating with said part automatically to stop the transfer device at the appropriate angle, means automatically to return the transfer device to the delivery position after it has delivered a round to the waiting tray, control means for keeping a round in position on the waiting tray, means for moving a round from the waiting tray to the loading tray when the latter is in the firing position, and means for releasing said control means when the round is to be delivered to the loading tray.

5. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, control means for keeping a round in position on the waiting tray, a pusher for pushing said round into the loading tray when the latter is in the firing position, and means for releasing said control means when the round is to be delivered to the loading tray.

6. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves into the loading position, a part movable with said transfer device, means movable with the gun cradle and cooperating with said part automatically to stop the transfer device at the appropriate angle, means automatically to return the transfer device to the delivery position after it has delivered a round to the waiting tray, control means for keeping a round in position on the waiting tray, a pusher for pushing said round into the loading tray when the latter is in the firing position, and means for releasing said control means when the round is to be delivered to the loading tray.

7. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, control means for keeping a round in position on the waiting tray, means actuated by the movements of the loading tray to move a round from the waiting tray to the loading tray when the latter is in the firing position, and means for releasing said control means when the round is to be delivered to the loading tray.

8. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves into the loading position, a part movable with said transfer device, means movable with the gun cradle and cooperating with said part automatically to stop the transfer device at the appropriate angle, means automatically to return the transfer device to the delivery position after it has delivered a round to the waiting tray, control means for keeping a round in position on the waiting tray, means actuated by the movements of the loading tray to move a round from the waiting tray to the loading tray when the latter is in the firing position, and means for releasing said control means when the round is to be delivered to the loading tray.

9. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves into the loading position, a part movable with said transfer device, means movable with the gun cradle and cooperating with said part automatically to stop the transfer device at the appropriate angle, means automatically to return the transfer device to the delivery position after it has delivered a round to the waiting tray, control means for keeping a round in position on the waiting tray, a pusher for pushing said round into the loading tray when the latter is in the firing position, a telescopic lever embodying a spring and coupling the loading tray to the pusher, a catch to hold the pusher against movement until the loading tray has moved over nearly to the firing position, whereby the spring is stressed, means operable by the movement of the loading tray to trip said catch, whereby the energy stored in the spring causes the pusher to operate, and whereby said control means are released.

10. An ammunition feeding device for a gun having a loading tray movable in a cycle from a firing position to a loading position and back to a firing position, and having side frames supporting the gun trunnions for movement with the gun in azimuth, comprising a framework carried by one of said side frames, wheels on said framework, a guide track fixed on the ground, said wheels being arranged to run on said guide track for the partial support of said framework, a magazine for rounds, said magazine being carried by said framework, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray to the loading tray when the latter is in the firing position.

11. An ammunition feeding device for a gun having a loading tray movable in a cycle from a firing position to a loading position and back to a firing position, and having side frames supporting the gun trunnions for movement with the gun in azimuth, comprising a platform attached to one of said side frames and rotatable with the gun in azimuth, a framework supported by said platform, wheels on said framework, a guide track fixed on the ground, said wheels being arranged to run on said guide track for the partial support of said framework, a magazine for rounds, said magazine being carried by said framework, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, and means for moving a round from the waiting tray to the loading tray when the latter is in the firing position.

12. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, an endless conveyor to feed a round automatically to the delivery position for each cycle of movement of the loading tray, a waiting tray mounted to move with the gun cradle, a transfer device mounted to swing about the trunnion axis of the gun and adapted to engage a round at the delivery position, means to actuate said transfer device automatically in timed relationship with the movement of the loading tray to transfer the round to the waiting tray, and means for moving a round from the waiting tray to the loading tray when the latter is in the firing position.

13. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, an endless conveyor to feed a round automatically to the delivery position for a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves into the loading position, a part movable with said transfer device, means movable with the gun cradle and cooperating with said part automatically to stop the transfer device at the appropriate angle, means automatically to return the transfer device to the delivery position after it has delivered a round to the waiting tray, and means for moving a round from the waiting tray to the loading tray when the latter is in the firing position.

14. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, an endless conveyor to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, control means for keeping a round in position on the waiting tray, means for moving a round from the waiting tray to the loading tray when the latter is in the firing position, and means for releasing said control means when the round is to be delivered to the loading tray.

15. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, an endless conveyor to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to tranfer the round to the waiting tray, control means for keeping a round in position on the waiting tray, means actuated by the movements of the loading tray to move a round from the waiting tray to the loading tray when the latter is in the firing position, and means for releasing said control means when the round is to be delivered to the loading tray.

16. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round to the waiting tray, and means for moving a round from the waiting tray to the loading tray when the latter is in the firing position, said transfer device comprising clips adapted to support and retain a round, means for rotating said clips when the device reaches the waiting tray to remove the round from the device and deliver it to the waiting tray, holding means for positively holding said clips in position after rotary movement in either direction, and means for tripping said holding means in timed relationship with the movements of the transfer device and restoring the clips to their previous position for the purpose described.

17. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, feeding means to feed a round automatically to the delivery position for each cycle of movement of the loading tray, a waiting tray mounted to move with the gun cradle, a transfer device mounted to swing about the trunnion axis of the gun and connected and arranged to engage a round at the delivery position, means to actuate said transfer device automatically in timed relationship with the movement of the loading tray to transfer the round from the delivery position to the waiting tray as the loading tray moves in to the loading position, a part movable with said transfer device, means movable with the gun cradle and cooperating with said part automatically to stop the transfer device at the appropriate angle, means automatically to return the transfer device to the delivery position after it has delivered a round to the waiting tray, and means for moving a round from the waiting tray to the loading tray when the latter is in the firing position, said transfer device comprising clips adapted to support and retain a round, means for rotating said clips when the device reaches the waiting tray to remove the round from the device and deliver it to the waiting tray, holding means for positively holding said clips in position after rotary movement in either direction, and means for tripping said holding means in timed relationship with the movements of the transfer device and restoring the clips to their previous position for the purpose described.

18. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, an endless conveyor to feed a round automatically to the delivery position for each cycle of movement of the loading tray, an electric motor to drive said conveyor intermittently, a waiting tray mounted to move with the gun cradle, a transfer device mounted to swing about the trunnion axis of the gun and connected and arranged to engage a round at the delivery position, an electric motor to drive said transfer device and arranged to actuate said transfer device automatically in timed relationship with the movement of the loading tray to transfer the round to the waiting tray, and means for moving a round from the waiting tray to the loading tray when the latter is in the firing position, switches being provided to start and stop the said electric motors in timed relationship with the movements of the loading tray.

19. An ammunition feeding device for a gun having a loading tray movable in a cycle from a firing position to a loading position and back to a firing position, comprising a magazine for rounds, a delivery position to which rounds in the magazine are fed and which is stationary relative to the gun mounting, an endless conveyor to feed a round automatically to the delivery position for each cycle of movement of the loading tray, an electric motor to drive said conveyor intermittently, a waiting tray mounted to move with the gun cradle, a transfer device mounted to swing about the trunnion axis of the gun and connected and arranged to engage a round at the delivery position, an electric motor to drive said transfer device and arranged to actuate said transfer device automatically in timed relationship with the movement of the loading tray to transfer the round from the delivery position to the waiting tray as the loading tray moves into the loading position, a part movable with said transfer device, means movable with the gun cradle and cooperating with said part automatically to stop the transfer device at the appropriate angle, means automatically to return the transfer device to the delivery position after it has delivered a round to the waiting tray, and means for moving a round from the waiting tray to the loading tray when the latter is in the firing position, switches being provided to start and stop the said electric motors in timed relationship with the movements of the loading tray.

VALENTINE PEARCE HARVEY.
GORDON FRANCIS WELLINGTON POWELL.
WILLIAM WOOD.

REFERENCES CITED

The following references are of record in the file of this patent:

UNITED STATES PATENTS

| Number | Name | Date |
| --- | --- | --- |
| 329,471 | Maxim | Nov. 3, 1885 |
| 1,188,629 | Dawson et al. | June 27, 1916 |
| 1,753,850 | Courseuller | Apr. 8, 1930 |
| 2,004,855 | Daum | June 11, 1935 |
| 2,382,522 | Trotter | Aug. 14, 1945 |

FOREIGN PATENTS

| Number | Country | Date |
| --- | --- | --- |
| 706,222 | Germany | May 21, 1931 |
| 586,230 | Great Britain | Mar. 12, 1947 |